United States Patent [19]

Carsten

[11] Patent Number: 5,307,004
[45] Date of Patent: Apr. 26, 1994

[54] SOFT SWITCHING BOOST AND BUCK REGULATORS

[76] Inventor: Bruce W. Carsten, 2355 W. 14th Ave., Vancouver, Canada V6K 2W2

[21] Appl. No.: 909,257

[22] Filed: Jul. 6, 1992

[51] Int. Cl.⁵ .......................................... H02M 3/335
[52] U.S. Cl. .................... 323/222; 323/901; 323/259; 323/272; 363/49
[58] Field of Search ............... 323/222, 223, 225, 268, 323/272, 282, 255, 259, 901; 363/124, 49

[56] References Cited

U.S. PATENT DOCUMENTS

| | | | |
|---|---|---|---|
| 4,096,559 | 6/1978 | Sakurada et al. | 363/96 |
| 4,210,958 | 7/1980 | Ikenoue et al. | 363/124 |
| 4,669,023 | 5/1987 | Ohms | 361/56 |
| 4,977,493 | 12/1990 | Smith | 363/126 |
| 5,017,800 | 5/1991 | Divan | 307/66 |
| 5,038,267 | 8/1991 | De Doncker et al. | 363/89 |
| 5,047,913 | 9/1991 | De Doncker et al. | 363/95 |
| 5,107,151 | 4/1992 | Cambier | 307/570 |
| 5,166,149 | 11/1992 | De Doncker | 307/354 |
| 5,227,941 | 7/1993 | Rubin | 361/18 |

Primary Examiner—Steven L. Stephan
Assistant Examiner—Ben M. Davidson
Attorney, Agent, or Firm—Townsend and Townsend Khourie and Crew

[57] ABSTRACT

A switching regulator for achieving soft switching comprises a pilot switch in series with a diode, and a pilot inductor connected from the junction between the pilot switch and the diode to a tap on the main inductor. A bidirectional circuit operating as a buck or a boost regulator can be achieved by replacing all of the diodes with active switches and selectively activating certain of the switches.

21 Claims, 3 Drawing Sheets

SOFT SWITCHING BOOST AND BUCK REGULATORS

FIELD OF THE INVENTION

This invention relates to voltage boost and buck switching regulators. More particularly the invention relates to means for achieving "soft switching" of the switches in such a regulator reduce power losses and to reduce electromagnetic interference (EMI) associated with the switches.

BACKGROUND OF THE INVENTION

Conventional boost and buck regulators rely on controllable switches to alternately couple and uncouple an inductor between the input and the output of the regulator. Diodes are typically included in the circuit to provide isolation between the common or ground on the one hand, and the input or output of the regulator on the other hand when the switch is closed.

Ideally the switches are either fully ON (with zero voltage drop across the switch) or OFF (zero current), and energy transformation is 100% efficient. In practice this is approximately true. At switching frequencies up to tens of kilohertz the principal losses are the conduction losses in the switch and diode, which are difficult to avoid. There is also a loss during the finite interval spent switching "ON" and "OFF", during which the switch is sustaining both voltage and current. This loss can be minimized with fast switches such as Field Effect Transistors (FETs).

In order to reduce the size of the energy storage components (and thus the physical size of the regulator), conversion frequencies are rising to the 100 KH$_s$ to 1 MH$_s$ range. At these frequencies, two additional power losses become important.

The greater loss is due to "reverse recovery" effects in rectifiers. In practice, P-N junction diodes in the regulator circuit will not cease conducting immediately when the switch turns ON, but will allow reverse current to flow for a short time before "recovering" the ability block reverse current and sustain reverse voltage. This process typically requires 20 to 200 ns in fast rectifiers, depending on construction and voltage rating. Very high dissipative currents can flow while both the switch and the diode are conducting, and the energy loss each switching cycle becomes significant at high switching frequencies. The high momentary "reverse" current in the diode tends to cease fairly quickly, generating troublesome amounts of Electro-magnetic Interference (EMI).

An additional loss at high frequencies is the dissipative discharge of the junction capacity of the switch (and other parasitic circuit capacities) when the switch turns ON. FETs are very fast switches, finding favour at high conversion frequencies. Unfortunately their self-capacity is relatively high, and increases if larger FETs are used to minimize conduction loss.

The reverse current flow in the diode (and EMI upon recovery) can be significantly reduced if the rate at which current drops to zero and reverses is reduced. This could be done by turning the switch ON slowly (or by using a slower switch), but this unfortunately increases switching loss (due to simultaneous current and voltage on across the switch) faster than reverse recovery losses are reduced.

One prior art approach to achieving soft switching is to place an inductor in series with either the main switch, or the diode. While this solution may reduce reversing losses, it does not recover the energy stored in the inductor.

A preferable approach is to use a second, pilot switch and a second inductor to reactively limit the rate of change of current through the diode. This might be done by providing a second inductor connected from the anode of the main diode to the second pilot switch to the common line. An auxiliary diode would be provided between the switch and the regulator output to recover the energy from the second inductor when the pilot switch is OFF. That approach suffers the drawback that the auxiliary diode may not be switched off by the time the main switch switches OFF, resulting in a build up of current in the diode and interfering with proper operation of the circuit.

SUMMARY OF THE INVENTION

The present invention relies on limiting the rate of change of current in the diode reactively and bringing the voltage on the switch to zero preparatory to switch turn on, thereby reducing dissipation losses from the junction and circuit capacities and further by ensuring that the auxiliary diode is switched OFF and remains OFF during the OFF cycle of the main switch. The circuit is achieved, in the case of the boost regulator, by replacing the switch by a transistor, and by tapping a second inductor from the windings of the main inductor which is in turn connected to the common line through a second switch. An auxiliary diode is connected to the output terminal. A diode is connected to the node between the second switch and the second inductor.

In one of its aspects, the invention consists of switching boost regulator comprising:

an input terminal, an output terminal and a common voltage line;

a first inductor, one end of which is connected to the input terminal and the other end of which is connected through passive first switch means to the output terminal, said first inductor having a winding with a tap near said other end;

a controllable second switch means connecting said other end of the first inductor to the common voltage line;

a second inductor, one end of which is connected to said tap, the other end of the second inductor being connected through a controllable third switch means to the common voltage line;

a passive fourth switch means connecting said other end of the second inductor to the output terminal.

BRIEF DESCRIPTION OF THE DRAWINGS

The invention will be more fully appreciated from the following detailed description with reference to the accompanying drawings, in which.

DESCRIPTION OF THE PREFERRED EMBODIMENT

Figure 1:
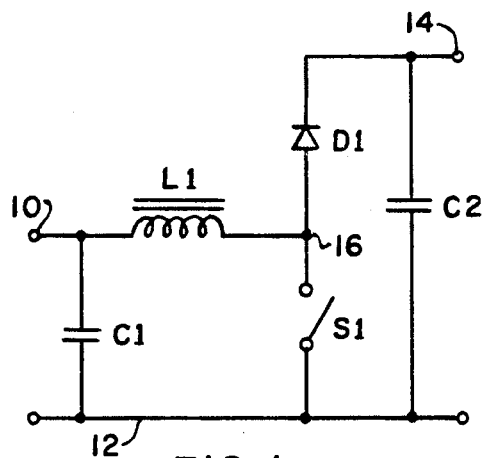
FIG. 1 is a basic prior art boost regulator.

FIG. 1 illustrates a prior art basic boost regulator. An input capacitor C1 is connected from input terminal 10 to the common line 12. Main inductor L1 is connected from input terminal 10 to the anode of main diode D1. The cathode of D1 is connected to the output terminal 14. An output capacitor C2 is connected across the output to provide output filtering and energy storage. A controllable main switch S1 is connected from node 16 (between L1 and D1) to the common line 12.

Figure 3:
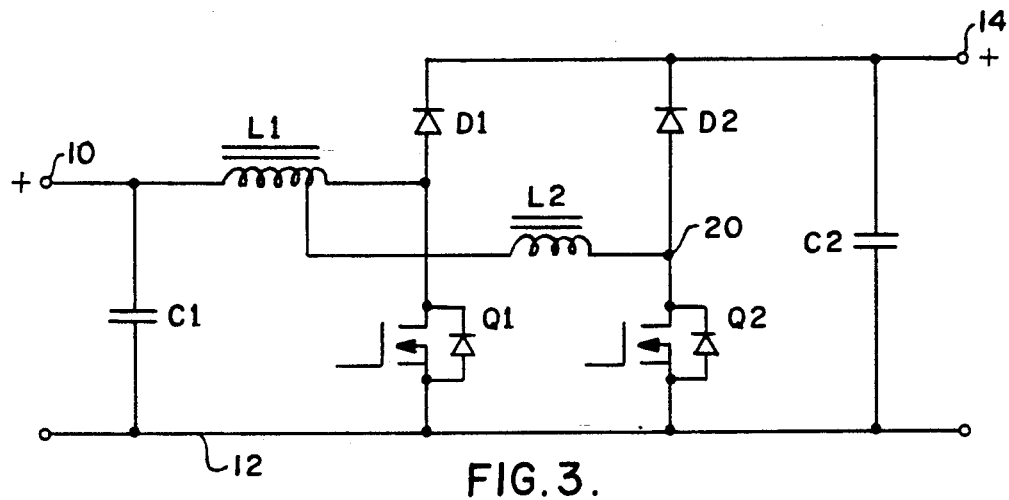
FIG. 3 is a soft switching boost regulator according to the invention.

FIG. 3 illustrates the preferred embodiment of the invention as applied to the boost regulator. Similar circuit elements to those of FIG. 1 are given identical numerals in FIG. 3. Accordingly, the circuit includes a common line 12, input terminal 10, input capacitor C1, main inductor L1, main diode D1, output capacitor C2 and output terminal 14.

S1 is replaced by a switching transistor Q1, shown as a FET with integral drain-source diode. A second "commutating" inductor L2 is tapped from the winding of L1 near but not at the output side 18 of the winding. L2 is small relative to L1 to ensure that it may reach its maximum current and discharge completely within each switching cycle as described below. The other end of L2 is connected to a second, "pilot" transistor Q2 (also shown as a FET) which in turn is connected to common line 12. Q2 can be smaller than Q1 to minimize losses as it is not switched under zero voltage conditions. The anode of a second diode D2 is connected to node 20 (between L2 and Q2) and its cathode is connected to output terminal 14.

Figure 5:
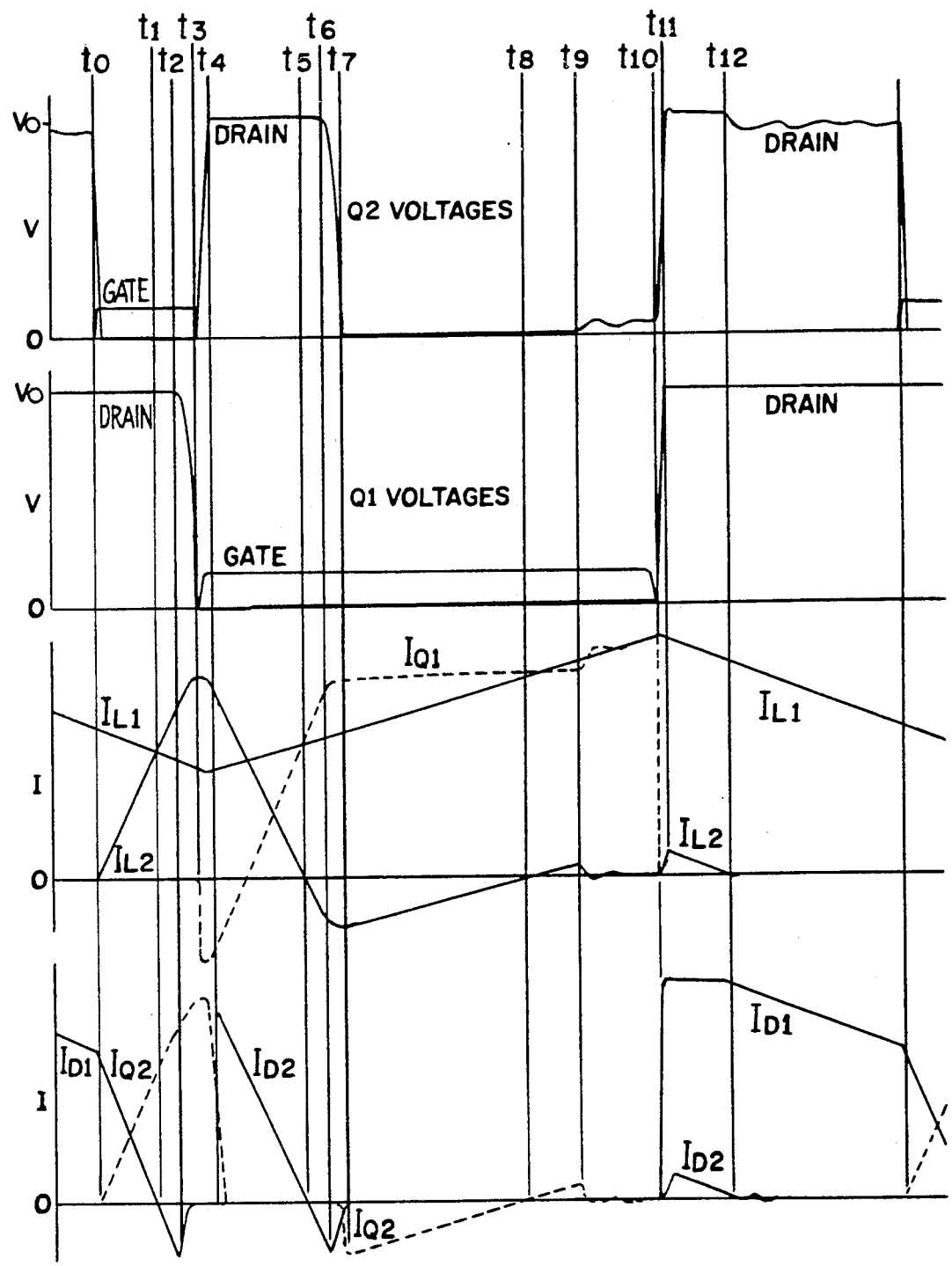
FIG. 5 illustrates voltage and current waveforms in the operation of the soft switching boost regulator according to the invention.

The operation of the circuit of FIG. 3 will now be explained by reference to the waveforms of FIG. 5.

Q2 is switched ON during the OFF cycle of S1 but near the end of that cycle (at $t_0$). L2 is used to reactively switch off D1 at a sufficiently slow rate to enable it to recover before high reversing loss currents are achieved. Specifically, when Q2 is switched ON, it begins to conduct at a gradually increasing rate limited by L2, thereby gradually diverting more current away from D1. Since the current depletion at D1 is controlled by L2, the reverse current does not reach inordinately high levels by the time the diode recovers (at $t_2$). In fact, such an approach realizes an improvement in reverse current losses in the diode of at least an order of magnitude over conventional switching regulators. Commensurate with this smoother recovery is a substantial reduction in EMI.

Once D1 has been switched off, the voltage on Q1 begins to fall, thereby discharging junction and circuit capacities to the point where zero voltage is achieved (at $t_3$). The junction and circuit capacities are therefore recovered in the circuit before Q1 is switched ON thereby reducing dissipation losses. The control circuit (not shown) then switches Q1 ON, as shown in FIG. 5 by its rise of gate voltage.

Once Q1 is switched ON, the normal switching cycle begins, with the current in L1 ramping upwards. Q2 is switched OFF son afterwards thereby forward biasing D2 (at $t_4$) and causing the energy in L2 to be transferred to the output.

At $t_5$ the current in L2 and D2 is zero, and begins to reverse.

At $t_6$ D2 recovers, and the voltage on Q2 begins to fall, with a small reverse current now flowing in L2.

At $t_7$ the voltage on Q2 is zero, and the FET's internal body-drain diode conducts. The L2 current again ramps toward zero, but more slowly with the low voltage impressed by the tap on L1. If transistors other than FETs are used which do not have intrinsic reverse diodes, then an external diode must be placed across Q2. A similar diode is also required across Q1, since a momentary reverse current flows just after $t_3$.

At $t_8$ the L2 current again reaches zero, and slowly reverses, flowing back through the L1 tap and Q1.

At $t_9$ the body-drain diode of Q2 recovers. The current in L2 is now low enough that no further significant changes occur; the voltage on Q2 undergoes a low level "ringing" around the L1 tap voltage as L2 oscillates with the parasitic capacities of Q2 and D2.

The normal conduction period ends at $t_{10}$ when Q1 is shut off, which causes the voltage on Q1 to rise as the L1 current charges the parasitic capacities of Q1 and D1. The capacities of Q2 and D2 are also charged, building up a small current in L2.

Switching Q1 OFF, causes a reversing of the polarity across the main inductor, forward biasing D1 and D2, and causing the current in L1 to ramp down. The steady-state voltage on Q2 will be limited by the tap to a voltage somewhat less than the voltage Vo across L1. This keeps D2 slightly reverse biases thereby preventing simultaneous conduction of D2 and D1 for the majority of the OFF cycle of Q1, and consequently preventing a build up of current in D2.

More specifically at $t_{11}$ the voltage on Q1 reaches Vo and D1 conducts. The D2 voltage also reaches Vo, and the L2 current flows through D2. The L1 current ramps down until Q2 is turned on again to start a new switch cycle.

At $t_{12}$ the L2-D2 current falls to zero, and the Q2 voltage falls to that on the L1 tap, with a small amount of ringing between L2 and the capacities of Q2 and D2.

It will therefore be appreciated that operation of the pilot switch Q2 causes the current in the main diode D1 to ramp downwards and to reverse at a rate controlled by the commutating inductor L2, thereby minimizing reverse recovery effects in the main diode and bringing the voltage on Q1 to zero preparatory to turn-on. The auxiliary diode D2 recovers the energy stored in the commutating inductor after Q1 turns ON and the pilot switch Q2 turns OFF. The tap on the main inductor provides a voltage which resets the current in the commutating inductor to zero after reverse recovery of the auxiliary diode and the tap maintains a reverse bias for the auxiliary diode during the OFF period of the main switch. In addition, the tap on L1 will cause the current in D2 to continue to ramp downward in the case of narrow duty cycle operation of Q1 when Q1 turns off before the current in L2 has ramped down to zero (between $t_4$ and $t_5$).

Figure 2:
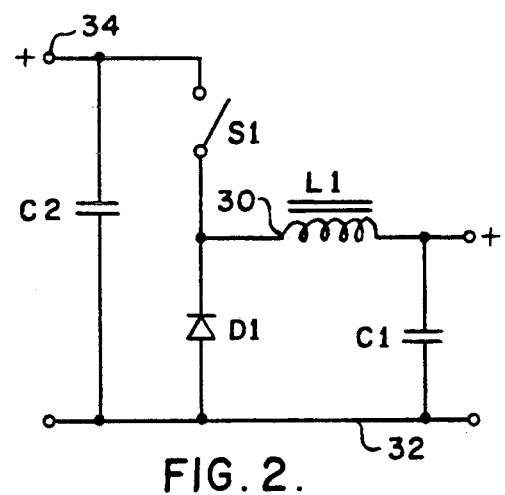
FIG. 2 is a basic prior art buck regulator.
Figure 4:
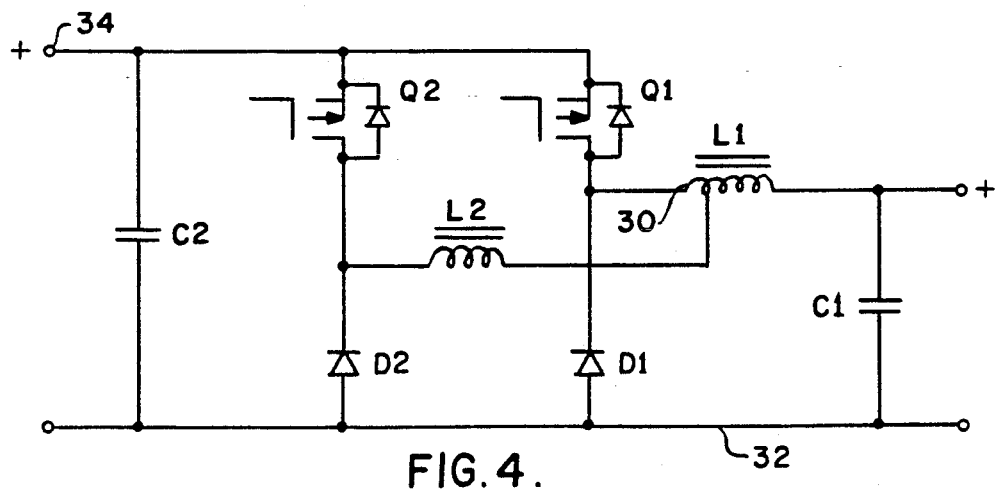
FIG. 4 is a soft switching buck regulator according to the invention.

Referring briefly to the soft switching buck regulator circuit of FIG. 4 as compared to the basic prior art buck regulator shown in FIG. 2, the main switch S1 of FIG. 2 is replaced by a transistor Q1. A commutating inductor L2 is tapped from main inductor L1 near the input end 30 of L1. The other end of L2 is connected to the cathode of auxiliary diode D2, the cathode of which is connected to common line 32. The cathode of D2 is also connected to Q2 which is in turn connected to input terminal 34.

Operation of the buck regulator is similar to that of the boost circuit. From the state where Q1 and Q2 are both OFF, Q2 turns ON first. Current ramps up in L2 until it exceeds that in L1, and D1 recovers. The voltage across Q1 falls to zero, when Q1 is turned on and Q2 turned off. The energy stored in L2 is delivered to the output through L1, whose current is now ramping upward. At the end of the conduction cycle, Q1 is turned off and L1 current ramps downward until the cycle starts again.

It will be appreciated by those skilled in the art that certain modifications to the preferred embodiments described herein, including electrical equivalents, may be made without departing from the principles of the invention.

For example, in the boost regulator, the pilot inductor could be tapped from a separate smaller auxiliary winding of the main inductor rather than directly onto the main winding. This auxiliary winding would be connected from the main inductor to the pilot inductor and would be phased to buck the main winding. If this auxiliary winding is loosely coupled to the main L1 winding, the resulting leakage inductance can form part or all of the L2 inductance. In the latter case, a physically discrete inductor L2 would not be required although it would still be present electrically. A similar arrangement would also be effective for the buck regulator.

Figure 6:
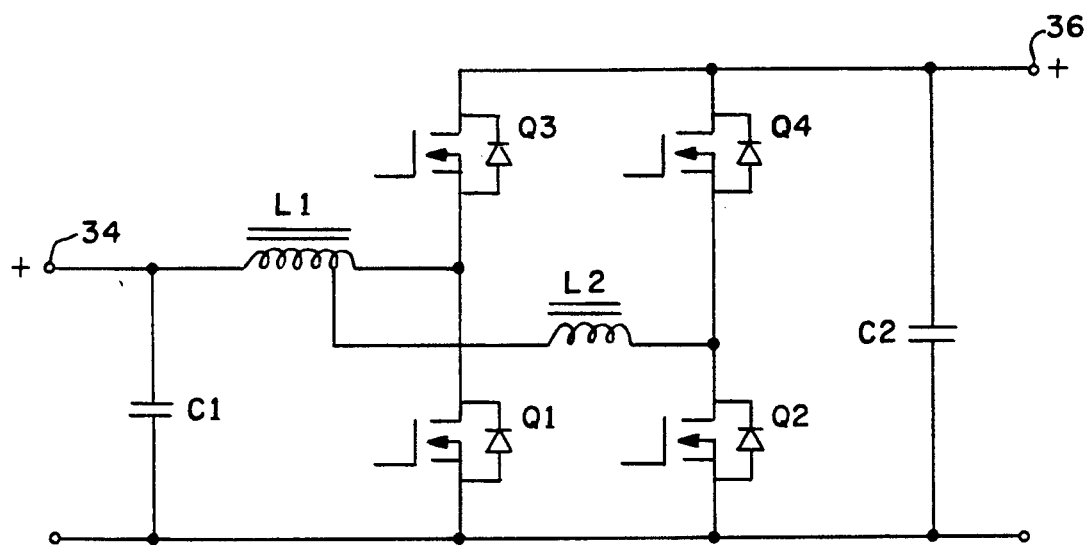
FIG. 6 illustrates a bi-directional circuit according to the invention.

The main and auxiliary diodes might also be replaced with active switches such as FETs, as illustrated in FIG. 6, which will act as simple diodes when OFF. This arrangement would allow the circuit to provide 2-way operation by selecting the appropriate switches to be passive and active.

For example, Q3 and Q4 can be turned OFF during operation of the circuit thereby relying on the internal diodes as circuit elements. If terminal 34 is then treated as the input terminal and terminal 36 is treated as the output terminal, with Q1 and Q2 operated as described above, the circuit of FIG. 6 will act as a soft switching boost regulator.

On the other hand, turning Q1 and Q2 OFF, and treating terminal 36 as the input terminal and terminal 34 as the output terminal, and switching Q3 and Q4 as described in relation to FIG. 4 results in operation of the circuit of FIG. 6 as a soft switching buck regulator.

Finally, the polarities of all diodes and active switches could be reversed thereby allowing operation of the circuits with negative input and output voltages.

What I claim is:

1. A switching boost regulator comprising:
   an input terminal, an output terminal and a common voltage line;
   a first inductor, comprising a continuous winding, one end of which continuous winding is connected to the input terminal and the other end of which is connected through passive first switch means to the output terminal, said continuous winding have a tap near said other end of the continuous winding;
   active controllable second switch means connecting said other end of the continuous winding to the common voltage line;
   a second inductor, one end of which is connected to said tap, the other end of the second inductor being connected through active controllable third switch means to the common voltage line;
   a passive fourth switch means connecting said other end of the second inductor to the output terminal.

2. The switching boost regulator of claim 1 wherein the passive first switch means is a first diode and wherein the passive fourth switch means is a second diode.

3. The switching boost regulator of claim 2 wherein the anode of the first diode is connected to said other end of the continuous winding and the cathode of the first diode is connected to the output terminal, and wherein the anode of the second diode is connected to said other end of the second inductor and the cathode of the second diode is connected to the output terminal.

4. The switching boost regulator of claim 2 or 3 wherein the second inductor has less inductance than the continuous winding.

5. The switching boost regulator of claim 2 or 3 further including a first capacitor between the input terminal and the common voltage line, and a second capacitor between the output terminal and the common voltage line.

6. In a switching boost regulator comprising:
   an input terminal, an output terminal and a common voltage line;
   a first inductor comprising a continuous winding, one end of which continuous winding is connected to the input terminal and the other end of which is connected through passive first switch means to the output terminal, said continuous winding having a tap near said other end of the continuous winding;
   active controllable second switch means connecting said other end of the continuous winding to the common voltage line;
   a second inductor, one end of which is connected to said tap, the other end of the second inductor being connected through active controllable third switch means to the common voltage line;
   a passive fourth switch means connecting said other end of the second inductor to the output terminal;
   a method of controlling the switching boost regulator comprising the steps of:
   a) switching the third switch means ON;
   b) switching the second switch means ON when the voltage across the second switch means is approximately zero;
   c) switching the third switch means OFF;
   d) switching the second switch means OFF.

7. A switching boost regulator comprising:
   an input terminal, an output terminal and a common voltage line;
   a first inductor having a main and an auxiliary winding, one end of the main winding being connected to the input terminal and the other end being connected through passive first switch means to the output terminal;
   active controllable second switch means connecting said other end of the main winding to the common voltage line;
   the said auxiliary winding of said first inductor being connected between said other end of said main winding and one end of a second inductor and being phased to buck the main winding;
   the other end of said second inductor being connected through active controllable third switch means to the common voltage line;
   a passive fourth switch means connecting said other end of the second inductor to the output terminal.

8. A switching boost regulator comprising:
   an input terminal, an output terminal and a common voltage line;

a first inductor having a main and an auxiliary winding, one end of the main winding being connected to the input terminal and the other end being connected through passive first switch means to the output terminal;

active controllable second switch means connecting said other end of the main winding to the common voltage line;

a second inductor comprised of said auxiliary winding of said first inductor loosely coupled to the main winding and phased to buck a portion of the main winding voltage, one end of said auxiliary winding being connected to said other end of the main winding and the other end of said auxiliary winding being connected through active controllable third switch means to the common voltage line;

a passive fourth switch means connecting said other end of the auxiliary continuous winding to the output terminal.

9. A switching buck regulator comprising:

an input terminal, an output terminal and a common voltage line;

a first inductor comprising a continuous winding, one end of which winding is connected to the output terminal and the other end of which is connected through active controllable first switch means to the input terminal, and said continuous winding having a tap near said other end;

a passive second switch means connecting said other end of the continuous winding to the common voltage line;

a second inductor, one end of which is connected to said tap, the other end of the second inductor being connected through a passive third switch means to the common voltage line;

active controllable fourth switch means connecting said other end of the second inductor to the input terminal.

10. The switching buck regulator of claim 9 wherein the passive second switch means is a first diode whose cathode is connected to said other end of the continuous winding and whose anode is connected to the common voltage line, and wherein the passive third switch means is a second diode whose cathode is connected to said other end of the second inductor and whose anode is connected to the common voltage line.

11. The switching buck regulator of claim 10 wherein the second inductor has less inductance than the continuous winding.

12. The switching buck regulator of claim 10 or 11 further including a first capacitor between the input terminal and the common voltage line, and a second capacitor between the output terminal and the common voltage line.

13. In a switching buck regulator comprising:

an input terminal, an output terminal and a common voltage line;

a first inductor comprising a continuous winding, one end of which continuous winding is connected to the output terminal and the other end of which is connected through active controllable first switch means to the input terminal, and said continuous winding having a tap near said other end;

a passive second switch means connecting said other end of the continuous winding to the common voltage line;

a second inductor, one end of which is connected to said tap, the other end of the second inductor being connected through a passive third switch means to the common voltage line;

active controllable fourth switch means connecting said other end of the second inductor to the input terminal;

a method of controlling the switch buck regulator comprising the steps of:

a) switching the fourth switch means ON;
b) switching the first switch means ON when the voltage across the first switch means is approximately zero;
c) switching the fourth switch means OFF;
d) switching the first switch means OFF.

14. A switching buck regulator comprising:

an input terminal, an output terminal and a common voltage line;

inductor means having a main and an auxiliary winding, one end of the main winding being connected to the output terminal and the other end being connected through passive first switch means to the common voltage line;

active controllable second switch means connecting said other end of the main winding to the input terminal;

the said auxiliary winding being connected between said other end of said main winding and one end of a second inductor, and being phased to buck the main winding;

the other end of the second inductor being connected through active controllable third switch means to the input terminal;

a passive fourth switch means connecting said other end of the second inductor to the common voltage line.

15. A switching buck regulator comprising:

an input terminal, an output terminal and a common voltage line;

inductor means having a main and an auxiliary winding, one end of the main winding being connected to the output terminal and the other end being connected through passive first switch means to the common voltage line;

active controllable second switch means connecting said other end of the main winding to the input terminal;

a second inductor comprised of said auxiliary winding loosely coupled to the main winding and phased to boost a portion of the main winding voltage, one end of said auxiliary winding being connected to said other end of said main winding and the other end of said auxiliary winding being connected through active controllable third switch means to the input terminal;

a passive fourth switch means connecting said other end of the auxiliary winding to the common voltage line.

16. A switching regulator comprising:

a first terminal, a second terminal and a common voltage line;

a first inductor comprising a continuous winding, one end of which winding is connected to the first terminal and the other end of which is connected through first active controllable switch means to the second terminal, and said continuous winding having a tap near said other end;

active controllable second switch means connecting said other end of the continuous winding to the common voltage line;

a second inductor one end of which is connected to said tap, and the other end of which is connected through active controllable third switch means to the second terminal;

active controllable fourth switch means connecting said other end of the second inductor to the common voltage line.

17. The switching regulator of claim 16 further including a first capacitor from the first terminal to the common voltage line and a second capacitor from the second terminal to the common voltage line.

18. The switching regulator of claim 16 wherein said first, second, third and fourth switch means comprise unidirectional controllable switches with anti-parallel diodes to conduct reverse current.

19. The switching regulator of claim 18 wherein said first, second, third and fourth switch means comprise field effect transistors.

20. A method of operating the switching regulator of claim 18 as a switching boost regulator by turning OFF said first and third switch means and using the first terminal as an input terminal and using the second terminal as an output terminal and controlling the regulator by performing the steps of:
 a) switching the fourth switch means ON;
 b) switching the second switch means ON when the voltage across the second switch means is approximately zero;
 c) switching the fourth switch means OFF;
 d) switching the second switch means OFF.

21. A method of operating the switching regulator of claim 18 as a switching buck regulator by turning OFF said second and fourth switch means and using the second terminal as an input terminal and using the first terminal as an output terminal and controlling the regulator by performing the steps of:
 a) switching the third switch means ON;
 b) switching the first switch means ON when the voltage across the first switch means is approximately zero;
 c) switching the third switch means OFF;
 d) switching the first switch means OFF.

* * * * *